United States Patent [19]

Fukao et al.

[11] Patent Number: 5,432,616
[45] Date of Patent: Jul. 11, 1995

[54] DATA COMMUNICATION APPARATUS FOR NOTIFICATION OF THE RECEIPT OF A CALL WAITING SIGNAL

[75] Inventors: Tomoo Fukao; Naoharu Kido; Kazuyuki Tsukamoto; Minoru Yoshida; Ryuji Hosaka; Naoki Suto, all of Saitama, Japan

[73] Assignee: Fuji Xerox Co., Ltd., Tokyo, Japan

[21] Appl. No.: 770,436

[22] Filed: Oct. 3, 1991

[30] Foreign Application Priority Data

Jan. 17, 1991 [JP] Japan ................................. 3-015753

[51] Int. Cl.⁶ ..................... H04N 1/32; H04N 1/327
[52] U.S. Cl. .................... 358/434; 358/437; 358/438
[58] Field of Search ............ 358/437, 438, 405, , 358/435, 436, 434, 468; 379/100, 93

[56] References Cited

U.S. PATENT DOCUMENTS

| 4,581,656 | 4/1986 | Wada | 358/437 |
| 4,852,151 | 7/1989 | Dittakavi et al. | 379/93 |

FOREIGN PATENT DOCUMENTS

| 226562 | 12/1984 | Japan | H04N 1/32 |
| 63-67868 | 3/1988 | Japan . | |
| 1-49370 | 2/1989 | Japan . | |
| 64-86660 | 3/1989 | Japan . | |

*Primary Examiner*—Scott A. Rogers
*Attorney, Agent, or Firm*—Finnegan, Henderson, Farabow, Garrett & Dunner

[57] ABSTRACT

A date communication apparatus in which a message stored in advance is transmitted to a receiving station so as to notify the receiving station that a call-waiting signal has been received, if a call-waiting signal is received by a transmitting station during communication. The reception of a request for line connection from a third station is detected by the call-waiting-signal detecting unit of a transmitting station on the basis of the call-waiting signal transmitted by an exchange. If the call-waiting signal is detected, a preset message is read from a message storage unit, and is transmitted to the other station. This message is transmitted either upon completion of the transmission of all the predetermined data or upon completion of the transmission of data, for instance, in units of pages. By means of this message, it is possible for the operator of the receiving station to identify that the cause of the disconnection of the line and the disturbance of the data is due to the reception of the call-waiting signal.

5 Claims, 5 Drawing Sheets

A CALL-WAITING-SIGNAL IS RECEIVED DURING TRANSMISSION. IF ANY DISTURBANCE HAS OCCURED, PLEASE CONTACT US.

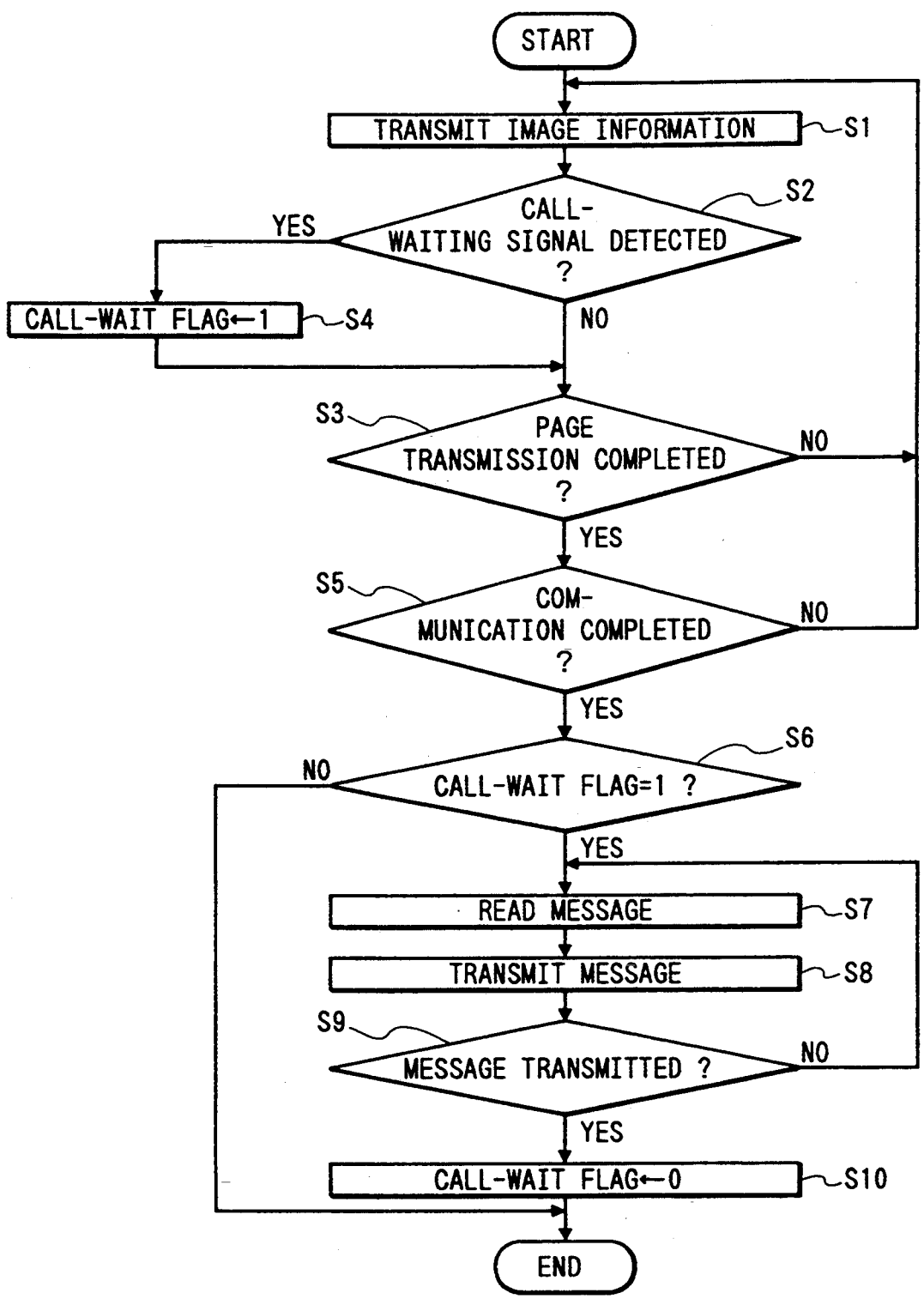

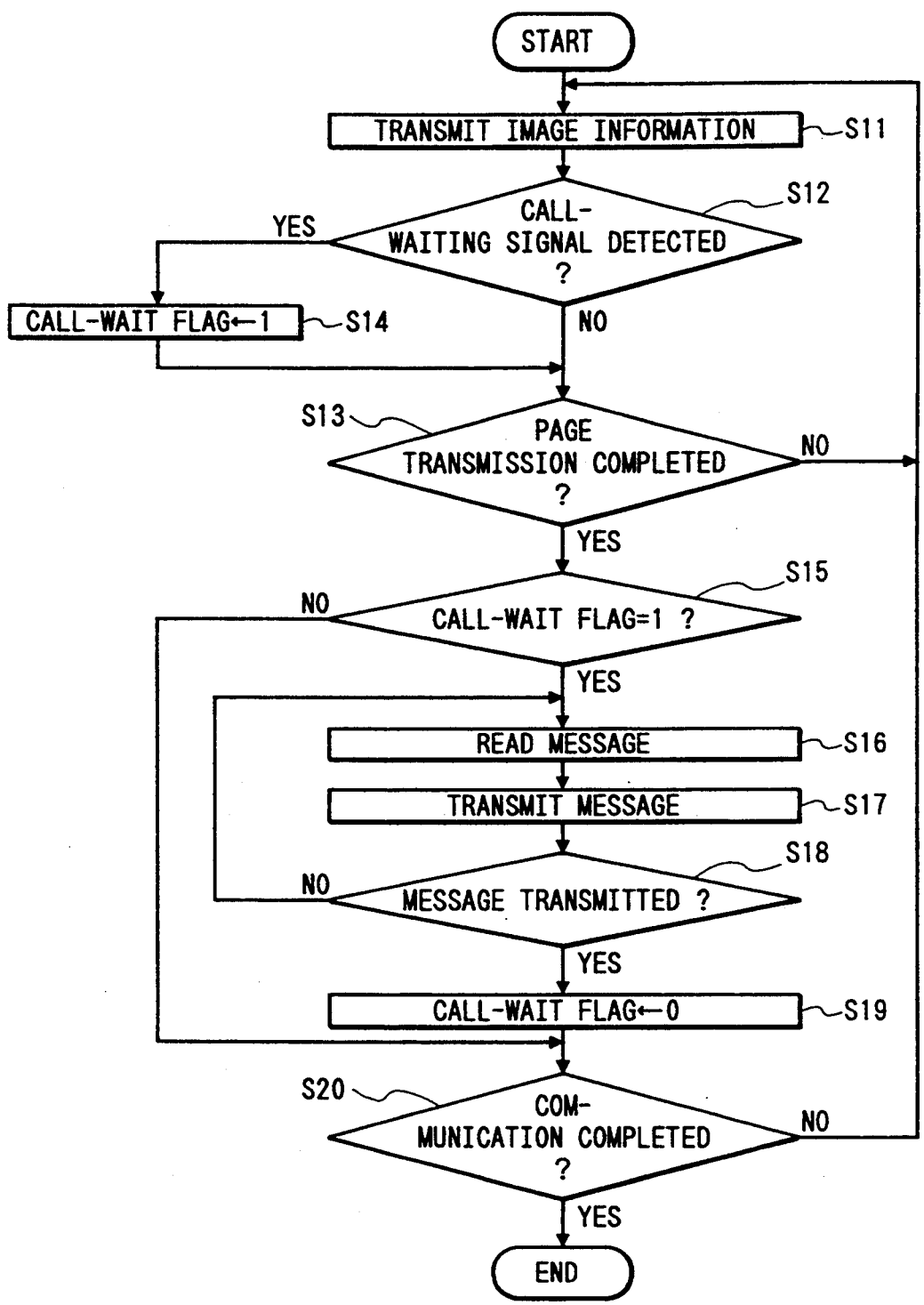

DATA COMMUNICATION APPARATUS FOR NOTIFICATION OF THE RECEIPT OF A CALL WAITING SIGNAL

BACKGROUND OF THE INVENTION

The present invention relates to a data communication apparatus, and more particularly to a data communication apparatus having the function of processing in a case where an interruption is generated to one's own station from a third party's station during transmission of data.

A communication system is known which is adapted to transmit and receive image data between facsimile apparatuses, or transmit and receive data by connecting information processing apparatuses including a personal computer by means of telephone lines. In such a communication system, a method of communication in which in a case where a request for line connection is made to a data-transmitting station from a third station, the present communication is interrupted immediately is disclosed in Japanese Patent Application Laid-Open Nos. 63-67868 and 64-86660. In these communication methods, if, during data transmission, an interruption signal has been received from another party or an operator has given an instruction due to a need to effect arbitrary interruption processing, the line is disconnected and data communication is interrupted. Then, after executing predetermining interruption processing, the data transmission is resumed automatically.

However, in a case where the communication which has been subjected to an interruption request is a communication whose content is more urgent, the communication can by no means be interrupted immediately in the manner of this communication method. Accordingly, if cases such as this is taken into consideration, it is inevitable to provide a setting such that the communication with the initial party of communication is continued without responding to the call from the third party.

In the case where the present communication is continued without responding to a call from a third party as described above, the following problems have been encountered.

That is, if a call is made from a third party during communication, there are cases where a disturbance occurs in the transmission data due to the call signal. For instance, if a request for line connection is made from a third party during facsimile communication between two stations, this request is detected by an exchange, and a call waiting signal having a predetermined frequency and an intermittent ringing interval is transmitted to the transmitting station. As a result, there are cases where the transmitted image information is disturbed by this call-waiting signal. Since the call-waiting signal is frequently continued until the line is connected to a third station, it follows that the image information cannot be transmitted properly in the meantime.

In addition, even if the communication is interrupted immediately in response to the call-waiting signal, as a minimum, the image information of the page which was being transmitted during reception of the call-waiting signal is disturbed.

If such a disturbance occurs in the image information, the operator of the receiving station who does not know that an interruption has been generated to the transmitting station due to the call-waiting signal or the like cannot identify the cause, so that the operator will become anxious about it unnecessarily.

SUMMARY OF THE INVENTION

An object of the present invention is to provide a data communication apparatus which is capable of overcoming the above-described problems and which, if a call is received from a third station during data transmission, is capable of letting the present other station of communication know to that effect.

To overcome the above-described problems and attain the above-described object, the data communication apparatus according to the present invention comprises storage means for storing in advance a message to notify to a receiving station that an interruption request from another station has been received, and means for detecting, in response to the detection of the interruption request by said detecting means, interruption signal from another station during data transmission with the receiving station, wherein the message is read and transmitted to the receiving station upon completion of the transmission of a predetermined unit data even when the interruption request is rejected.

In accordance with the present invention arranged as described above, if an interruption from a third party due to a call-waiting signal or the like is detected, the transmitting station is capable of notifying the receiving station to that effect. Then, the notification is executed upon completion of a page being transmitted when the call-waiting signal is received, or upon completion of the transmission of a final page. Accordingly, the receiving station is capable of ascertaining that an interruption signal has been generated to the transmitting station on the basis of the notification.

BRIEF DESCRIPTION OF THE DRAWINGS

FIG. 4 is a flowchart illustrating the operation of a transmitting station;

FIG. 6 is a flowchart illustrating the operation of a second embodiment; and

DESCRIPTION OF PREFERRED EMBODIMENT

Figure 1:
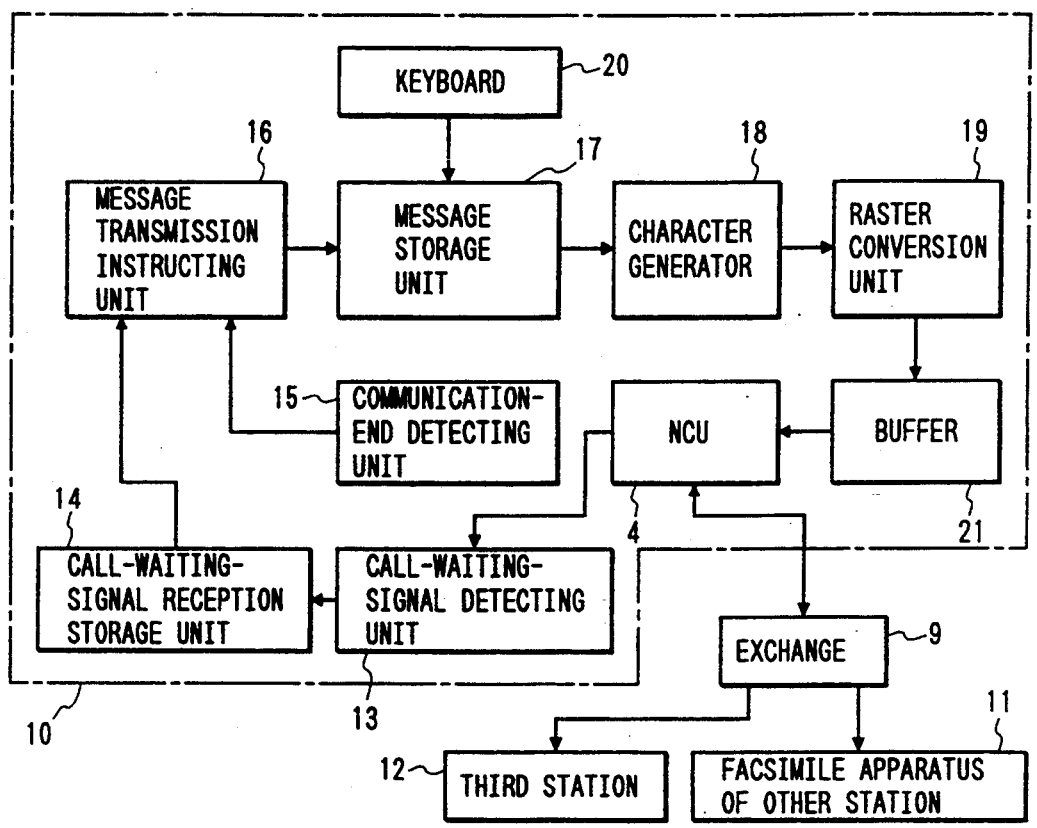
FIG. 1 is a block diagram of functions of essential units of a control section showing an embodiment of the present invention.

Referring now to the drawings, a detailed description will be given of the present invention.

Figure 2:
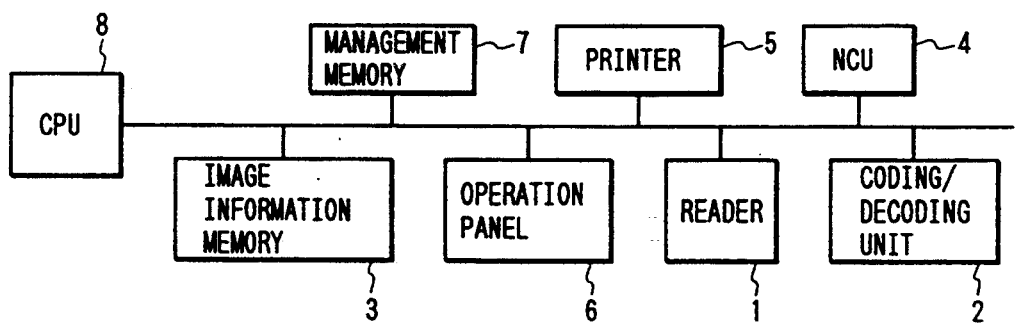
FIG. 2 is a block diagram illustrating a hardware configuration of a facsimile apparatus.

FIG. 2 is a block diagram illustrating a hardware configuration of a facsimile apparatus showing an embodiment of the present invention. In the drawing, the image information of a document read by a reader 1 is coded by a coding/decoding unit 2, and is accumulated in an image information memory 3. The accumulated image information is consecutively transmitted to a line via a network control unit (NCU) 4.

Meanwhile, at the time of reception, the image information fetched from the line is temporarily accumulated in the image information memory 3, is then decoded by the coding/decoding unit 2, and is printed out by a printer 5. An operation panel 6 is provided with a keyboard and a display which are used for inputting various instructions and displaying the results of processing.

The aforementioned elements are controlled by a CPU 8 in accordance with a program and management data stored in a management memory 7.

Next, a description will be given of the function of this embodiment. FIG. 1 is a block diagram illustrating the functions of essential units in accordance with this embodiment. In the drawing, connected to an exchange 9 are a facsimile apparatus 10 having the above-described configuration, a facsimile apparatus 11 which is the other station, and a third station 12. It goes without saying that a multiplicity of other data communication apparatuses such as telephones and facsimile apparatuses are connected to the exchange 9.

It is now assumed that image information is being transmitted to the facsimile apparatus 11 from the facsimile apparatus 10 serving as the transmitting station. Hereinafter, the facsimile apparatus 10 will be referred to as the transmitting station, and the facsimile apparatus 11 as the receiving station. When a request for line connection with respect to the transmitting station 10 is made from the third station 12 during transmission of an image between the transmitting station 10 and the receiving station 11, a call-waiting signal is outputted from the exchange 9 to the transmitting station 10. The call-waiting signal inputted to the network control unit (NCU) 4 is detected by a call-waiting-signal detecting unit 13 as being a call-waiting signal. The call-waiting signal is an intermittent signal of 400 Hz. Accordingly, the spectrum of the input signal is monitored by the call-waiting-signal detecting unit 13, and the arrangement provided is such that when the spectrum of the 400 Hz signal is far stronger than other signals, and is intermittent at predetermined intervals, the 400 Hz signal is determined to be the reception of a call-waiting signal. The reception of the call-waiting signal is stored in a call-waiting-signal reception storage unit 14.

A communication-end detecting unit 15 detects the end of communication on the basis of whether all the image information accumulated in the image information memory 3 has been transmitted. A message-transmission instructing unit 16 reads the content stored in the call-waiting-signal reception storage unit 14 in response to a detection signal supplied thereto from the communication-end detecting unit 15. Then, upon recognizing from the content that a call-waiting signal has been received, the message-transmission instructing unit 16 outputs an instruction signal for reading the data stored in a message storage unit 17. A message such as the one shown in FIG. 3, to the effect that a call-waiting signal has been received, is stored in the message storage unit 17. This message is a character code inputted through a keyboard 20 on the operation panel 6.

A character generator 18 converts a character code outputted from the message storage unit 17 to binary data representing characters. Furthermore, after this binary data is converted to data in units of scanning lines by a raster conversion unit 19, the data is accumulated in a buffer 21, and is transmitted to the line via the NCU 4.

Next, the operation of this embodiment will be described with reference to a flowchart shown in FIG. 4. In the drawing, in Step S1 the transmission of image information is started, and in Step S2 a determination is made as to whether or not a call-waiting signal has been detected. If the call-waiting signal has not been detected, the operation proceeds to Step S3 to determine whether or not all of the image information on one page has been transmitted.

If the call-waiting signal has been detected, the operation proceeds from Step S2 to Step S4 to set a call-waiting-signal reception flag, and the operation proceeds to Step S3.

If NO is the answer in Step S3, Steps S1 and S2 are repeated, while if YES is the answer, the operation proceeds to Step S5.

In Step S5, a determination is made as to whether or not the transmission of all the image information has been completed.

If the transmission of all the image information has been completed, the operation proceeds to Step S6 to determine whether or not the call-waiting-signal reception flag has been set.

If the call-waiting-signal reception flag has not been set, the data transmission is completed, while if the call-waiting-signal reception flag has been set, the operation proceeds to Step S7.

In Step S7, a character code is read from the message storage unit 17. The character code read is converted to character data, then subjected to raster conversion, and is transmitted to the line (Step S8).

In Step S9, a determination is made as to whether or not all the message has been transmitted, and if it is determined that all the message has been transmitted, the operation proceeds to Step S10 to clear the call-waiting-signal reception flag.

Figures 3, 5:
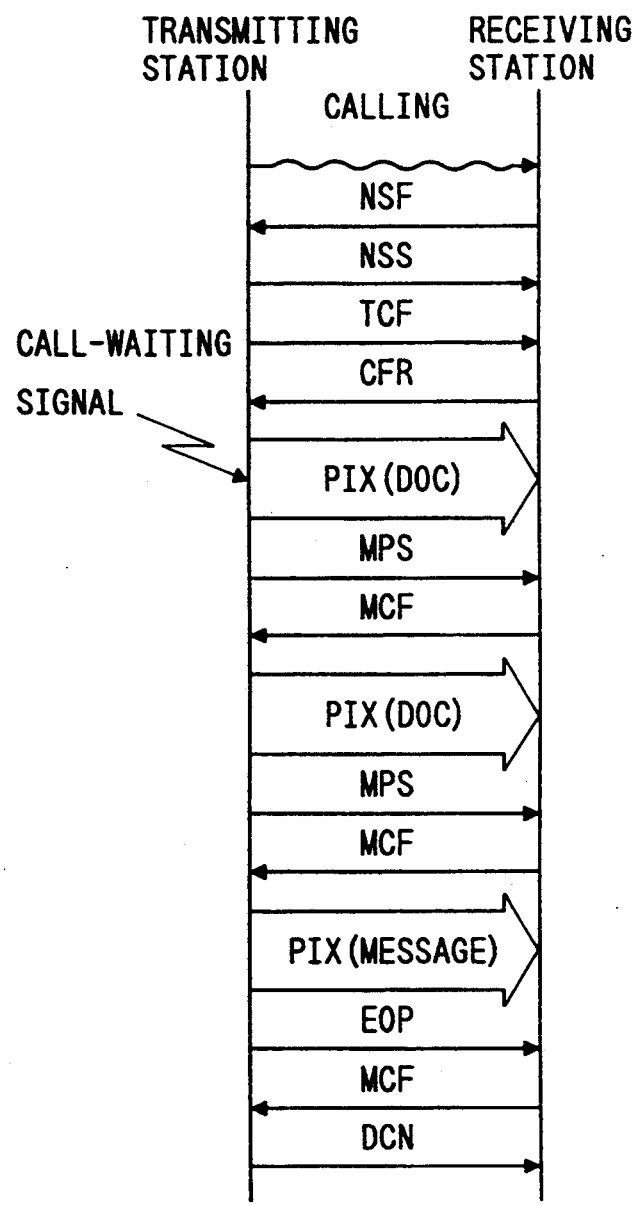
FIG. 3 is a diagram illustrating an example of a call-waiting-signal detection notifying message.
FIG. 5 is a sequence diagram illustrating a protocol of an embodiment.

An example of protocol communication in the above-described transmission and reception of image information is shown in FIG. 5. In FIG. 5, the procedures of phases A, B based on CCITT, T30 are executed, and image information PIX is sent. Upon completion of the transmission of a final page of the image information PIX, the transmitting station 10 determines the presence or absence of a call-waiting signal. Here, since the call-waiting signal has been applied during transmission of an initial document, a multi-page signal MPS is sent in order to send a message indicating that the call-waiting signal has been detected.

The receiving station 11 detects the multi-page signal MPS and sends a reception completion signal MCF. The transmitting station transmits the stored message in response to the reception completion signal MCF. Upon completion of the transmission of the message, the procedures of phases D, E are executed, thereby completing the communication.

In the embodiment described above, the arrangement provided is such a that after all the image information has been received, a determination is made as to whether or not a call-waiting signal has been received, and a message is transmitted on the basis of its result.

Alternatively, an arrangement may be provided such that a determination is made upon completion of the transmission of each page as to whether or not the call-waiting signal has been received, and the message is transmitted on the basis of its result.

FIG. 6 shows the operation of a second embodiment in which a determination is made upon completion of the transmission of each page as to whether or not the call-waiting signal has been received.

With respect to the operation of FIG. 6, since the communication end processing (Step 5) in FIG. 4 is merely moved to the final processing, and the other contents of processing are identical, a description thereof will be omitted, and only an illustration will be given.

It should be noted that although, in the functional block diagram shown in FIG. 1, a signal for starting the message-transmission instructing unit 16 is supplied from the communication end detecting unit 15, in order to effect the operation shown in FIG. 6, a means for detecting the end of transmission of each page of image information is provided, and the message-transmission instruction unit 16 is started by this means.

Figure 7:
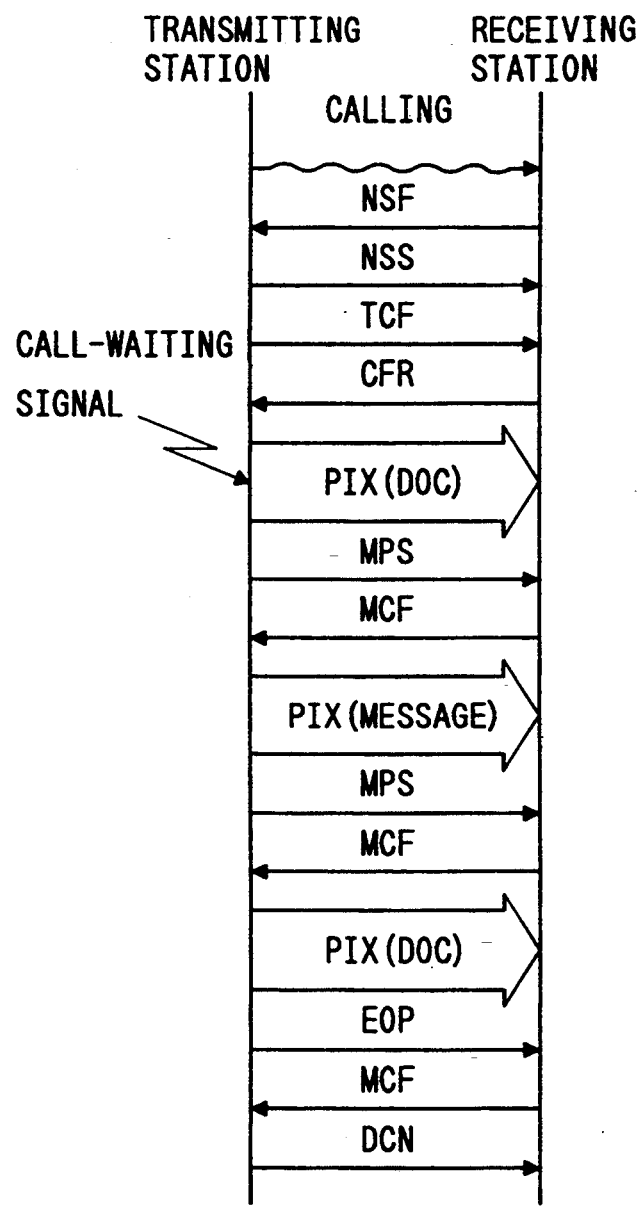
FIG. 7 is a sequence diagram illustrating a protocol of the second embodiment.

Next, an example of protocol communication in the second embodiment is shown in FIG. 7. In FIG. 7, in the same way as the first embodiment, the procedures of phases A, B based on CCITT, T30 are executed, and the image information PIX is sent. Upon completion of the transmission of one page of the image information PIX, the transmitting station 10 determines the presence or absence of the call-waiting signal. If the call-waiting signal is detected, the multi-page signal MPS is sent.

The receiving station 11 detects the multi-page signal MPS and sends the reception completion signal MCF. The transmitting station transmits the stored message in response to the reception completion signal MCF.

Subsequently, if there is any image information to be transmitted, the multi-page signal MPS is sent again, and after receiving the reception completion signal MCF from the receiving station 11, the transmitting station 10 sends the image information PIX. Upon completion of the transmission of a final page of the image information PIX, the procedures of phase D, E are executed, thereby completing the communication.

In the first and second embodiments described as above, the arrangement provided is such a that if the call-waiting signal is received, upon completion of the transmission of the image information of all the pages or each page, the message stored is automatically transmitted. However, whether or not such message-transmitting operation is to be effected automatically may be set by being inputted in advance through the operation panel 6.

In addition, an arrangement may be alternatively provided such that, in order to start the message-transmission instruction unit 16, both the communication-end detecting unit 15 and the means for detecting the completion of transmission of each page of image information are connected to the message-transmission instructing unit 16 via a switch, and an arbitrary one of the detecting means may be selected by the switching over by this switch. If this measure is adopted, it is possible to transmit the message notifying the reception of the call waiting signal by using a suitable method either between pages or after the transmission of all the pages.

It should be noted that it is possible to provide a means for detecting and storing a page number of the image information being transmitted at the time of detection of the call-waiting signal, and transmission is effected by adding this page number to the message.

Although in these embodiments a description has been given of an example of transmission and reception of image information between facsimile apparatuses, it goes without saying that the same processing can be effected in data communication between data communication apparatuses using a personal computer as terminal equipment as in these embodiments.

In addition, although in these embodiments a description has been given of a case in which an interruption signal is a call-waiting signal, the present invention may be applied to, for instance, an interruption communication system adopted by ATT of the United States of America. In this case, it suffices if the configuration of the call-waiting-signal detecting unit 13 is altered in such a manner as to detect the call signal of ATT, i.e., a mixed signal of 480 Hz and 620 Hz outputted at 60 IPM.

As is evident from the foregoing description, in accordance with the present invention, in the event that an interruption is generated to the transmitting station during data communication, it is possible to notify the receiving station to that effect. In addition, the receiving station need not be provided with a special function, and it suffices if the receiving station is provided with a means for receiving the image information and printing out in an ordinary manner, so that the versatility is high.

What is claimed is:

1. A data communication apparatus for transmitting data in units of predetermined amounts, comprising:
    storage means for storing in advance a message to be notified to a receiving station that an interruption request from another station has been received;
    detecting means for detecting the interruption request from the another station occurring during data transmission; and
    message generating means, in response to detection of the interruption request by said detecting means, for reading the message and for transmitting the message to the receiving station upon completion of the transmission of predetermined unit data, even when the interruption request is rejected.

2. A data communication apparatus as claimed in claim 1, wherein said message generating means comprising communication-end detecting means for detecting end of communication, page transmission monitoring means for detecting completion of the transmission of each of pages, and switching means for selecting one of outputs of said communication-end detecting means and said page transmission monitoring means, said message generating means transmitting the message to the receiving station in response to the selected output.

3. A data communication apparatus as claimed in claim 1, further comprising means for detecting and storing a page number of an image information being transmitted at the time of detection of the interruption, request the stored page number being added to the message.

4. A data communication apparatus as claimed in claim 1, wherein the interruption request is a call-waiting signal.

5. A data communication apparatus as claimed in claim 4, wherein the plurality of units of data is image information and the first communication device is a facsimile apparatus.

* * * * *

UNITED STATES PATENT AND TRADEMARK OFFICE
CERTIFICATE OF CORRECTION

PATENT NO. : 5,432,616
DATED : July 11, 1995
INVENTOR(S) : Tomoo FUKAO et al.

It is certified that error appears in the above-indentified patent and that said Letters Patent is hereby corrected as shown below:

Claim 3, column 6, line 52, delete "," and line 53, after "request" insert --,--.

Signed and Sealed this

Twenty-eighth Day of May, 1996

Attest:

BRUCE LEHMAN

Attesting Officer        Commissioner of Patents and Trademarks